United States Patent [19]
Cloarec

[11] 4,161,120
[45] Jul. 17, 1979

[54] EQUIPMENT FOR THE DETECTION OF ROTATION PARAMETERS IN PARTICULAR FOR A WHEEL-VELOCITY SENSOR

[75] Inventor: Jean-Claude Cloarec, Livry Gargan, France

[73] Assignee: WABCO Westinghouse, Freinville-Sevran, France

[21] Appl. No.: 903,624

[22] Filed: May 8, 1978

[51] Int. Cl.² ............................ G01P 3/48; G01P 1/00
[52] U.S. Cl. .......................................... 73/494; 73/518; 324/173
[58] Field of Search .................... 73/488, 494, 518; 324/166, 167, 173, 174, 178, 179; 180/105 E

[56] References Cited

U.S. PATENT DOCUMENTS

| 3,500,091 | 3/1970 | Jones | 324/174 X |
| 3,745,392 | 7/1973 | Phoenix et al. | 324/173 X |

*Primary Examiner*—Charles Gorenstein
*Attorney, Agent, or Firm*—R. W. McIntire, Jr.

[57] ABSTRACT

A wheel velocity sensor of the type having a toothed rotor and a stator with a detecting head mounted adjacent the rotor in proximity with the rotor teeth. The rotor is assembled with the bearing seal in the wheel hub as an integrated unit, being encased within a cavity formed in the seal to receive the rotor. The detecting head of the stator contacts the face of the seal, which is coated with a low friction material, so that a constant gap is maintained between the detecting head and rotor during rotation of the wheel to obtain more accurate wheel velocity signals.

5 Claims, 6 Drawing Figures

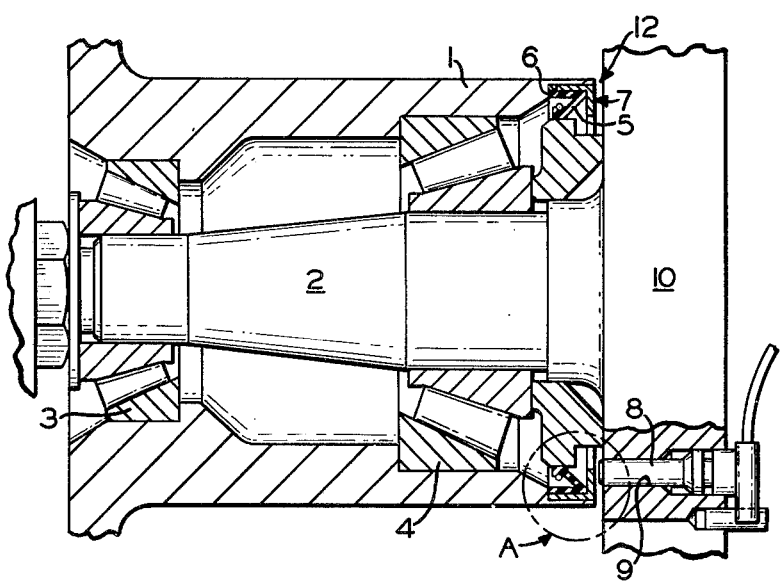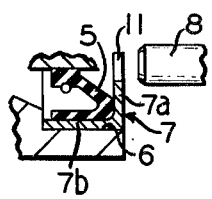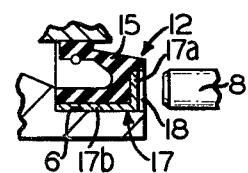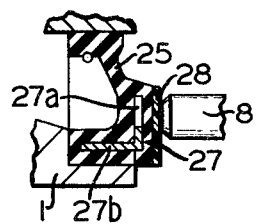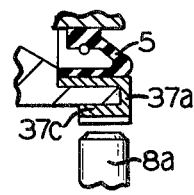

EQUIPMENT FOR THE DETECTION OF ROTATION PARAMETERS IN PARTICULAR FOR A WHEEL-VELOCITY SENSOR

BACKGROUND OF THE INVENTION

The present invention concerns a device for the detection of rotational parameters, in particular a sensor for detecting the velocity of a vehicle wheel consisting of a toothed ring mounted on a rotating piece (shaft, axle, or hub) in interdependent rotation with the wheel and of a detecting head placed in proximity with the teeth of the ring.

Wheel-velocity sensors are sometimes required on vehicles in order to supply electronic command or control circuits with signals representing the rotational velocity of the wheels, for example, for the purpose of detecting speed variations in order to command an anti-skid system, or in any other application calling upon the velocity of the vehicle and/or its wheels.

Such sensors are generally fitted with, first, a toothed ring rotating with an axle or a wheel of the vehicle and manufactured of magnetic material, and, second, a detecting head placed in proximity with the teeth of the ring; these sensors emit a pulse at the passage of each tooth of the ring and consequently generate signals proportional in frequency to the rotational velocity of the axle or the wheel.

SUMMARY OF THE INVENTION

The primary object of the invention is to simplify and to lower the cost of wheel-velocity sensors, especially with regard to their construction and their mounting on the vehicle.

This object is accomplished, according to one characteristic of the invention, in that the toothed ring forming the rotor of the sensor is fitted in a bore that is adapted to also receive a seal ring of the hub or axle bearing.

The result of this double utilization of the bore is that the accurateness with which it is made improves both the tightness of the bearing and the accuracy of the mounting of the toothed ring.

According to another characteristic of the invention, the toothed ring and the seal are combined and integrated into a single piece. This characteristic facilitates the disassembly of the seal and the ring.

Advantageously, the inside diameter of the seal is larger than the outside diameter of the bearing of the pillow block or of a brake disc associated with the wheel. Thus, rapid disassembly of the pillow-block bearing or of the brake disc is permitted; this solution avoids both the removal of the seal and the disassembly of the toothed ring.

When the seal is of the so-called "jointed lip" type, the toothed ring can also serve as a form of protection for the aforementioned seal. In particular, the seal can be fixed to the toothed ring by a suitable adhesive. The toothed ring can extend radially toward, or even beyond, the interior or the exterior with respect to the bore receiving the seal.

The toothed part of the ring and the ring itself can be completely encased by the seal; e.g. by means of an annular slit that closes elastically after installation of the ring. In such case, it can be advantageous to have the detecting head come in contact with the face of the seal in such a way that the thickness of the elastomer from which the seal is made and/or other material between this face and the toothed ring determine the gap between the detecting head and the toothed ring. A material with good friction qualities can be placed on the seal face that will come into contact with the detecting head.

Other objects and advantages of the present invention will appear in reading the nonlimitative description below accompanying the drawings.

FIG. 1 shows an elevational sectional view of a wheel-velocity sensor mounted on the axle of a road vehicle.

FIGS. 2 to 6 show on a larger scale several variations of detail A of FIG. 1.

DESCRIPTION OF THE INVENTION

The hub 1 shown in FIG. 1 is part of a road-vehicle wheel. The hub 1 is mounted on an axle by means of a pillow block containing two conical roller bearings 3, 4. Near the inside bearing 4 of the pillow block, a jointed lip seal 5 of a known type is placed in a bore 6 of the hub 1.

The wheel-velocity sensor according to the example represented is of the gap-variation type and contains a rotor element composed of a toothed ring 7; the latter is housed in the same bore 6 of the hub as the seal 5. This bore is cylindrical in the present case but it could be conical.

The result of this arrangement is that the preciseness of the bore 6, in order to perfectly center the seal 5, at the same time works to accurately center the toothed ring 7, thereby improving the quality of the signals supplied by the sensor.

A magnetic detecting head 8, which senses magnetic flux variations, constitutes the fixed part of the wheel-velocity sensor and is housed by a friction fit or by means of elastic detention in a lateral orifice 9 of a fixed flange 10 to which axle 2 is attached, such that the detecting head 8 is positioned opposite the teeth 11 of the ring 7.

As already mentioned in the introduction, it is preferable for the inside diameter of the gasket 5 and/or of the toothed ring 7 to be greater than the maximum outside diameter of the bearing, in order to be able to disassemble and replace this bearing without removing the seal 5.

Detail A of FIG. 1, shown in larger scale in FIG. 2, shows a representative arrangement of the assembly of the seal 5 and of the toothed ring 7 housed within the same bore 6.

The toothed ring 7 is formed by a stamped or molded piece of L-shaped radial section, notched on one branch 7a of the L projecting toward the interior. The other branch 7b of the L is cylindrical and is secured in bore 6 with a friction fit. Seal 5 in turn fits between the stop member 13 for bearing 4 and branch 7b of ring 7.

According to the arrangement shown in FIG. 3, the bore 6 receives a sealing and detecting assembly 12 composed of a lip seal 15 to which is glued a metallic toothed ring 17 with an L-shaped section having on its branch 17a, extending radially toward the interior, a notch 18 facing the detecting head 8.

According to FIG. 4, the seal and detecting assembly 12 comprises a lip seal 25 whose outer diameter fits within bore 6 of hub 1. An L-shaped ring 27 is encased within seal 25 via an annular slit formed in the seal. Ring 27 includes arms 27a and 27b, the former projecting radially inwardly and bearing teeth similar to the arrangement of FIGS. 1 and 2. A ring 28 of plastic-like material having a low frictional characteristic, such as "Nylon" or "Teflon" may be glued to seal 25 on the face opposite detecting head 8. The thickness of this low friction material forming ring 28 establishes and maintains the magnetic gap between the detector head 8 and teeth 27a relatively constant, since head 8 has rubbing engagement with ring 28.

FIG. 5 shows a toothed ring 37 of which the branch 37a bearing teeth extends beyond the bore 6 radially toward the exterior. In FIG. 6 the branch 37a extends beyond the bore 6 and is folded back to form a rim 37c parallel to the axis of bore 6 and bearing teeth facing radially toward detecting head 8a, which in this case lies in a radial plane.

It goes without saying that modifications can be made to the sensor described without leaving the scope of the invention. For example, the ring seal 5, 15, 25 can be composed of an X-shaped seal instead of a conventional lip seal. Instead of being of the type operating by variation of magnetic or electrical flux the detecting head 8, 8a can be of the optical or fluid type. The vehicles equipped with the sensor may be road or rail vehicles. Also, the toothed rim of ring 17 and 27, as shown in FIG. 3 or 4, can be entirely or partially embedded in the elastomeric material of the lip seal, fulfilling the two functions of stiffening the sealing packing and of providing the denticulation provoking variations of magnetic flux or of an electrical parameter. In such an arrangement, the detecting head 8 can come in direct contact with the face of the sealing packing opposite it; the gap between the head 8 and the denticulation 18 or 27a is then determined by a thickness of elastomer. A ring of material of good friction qualities such as "Nylon" or "Teflon" can be glued to the packing opposite the head 8 in order to reduce possible friction and wear between the fixed head and the rotating face of the packing.

Having now described the invention what I claim as new and desire to secure by Letters Patent, is:

1. For use with a vehicle wheel having a hub rotatably mounted on a spindle by bearing means and a bearing seal mounted in a bore of said hub, a wheel sensor device comprising:
   (a) a rotor with teeth on the periphery thereof;
   (b) a stator having a detecting head in proximity of said rotor teeth; and
   (c) an integrated assembly including said rotor and said bearing seal mounted in said bore of said rotor for rotation therewith; wherein the improvement comprises,
   (d) said seal having a cavity in which said rotor is housed so that the toothed portion of said rotor is encased by said seal.

2. The wheel sensor device recited in claim 1, further characterized in that said rotor is completely encased within said bearing seal.

3. The wheel sensor device recited in claims 1 or 2, further characterized in that the minimal diameter of said integrated rotor and seal assembly is greater than the maximal diameter of said bearing means.

4. The wheel sensor device as recited in claim 1, wherein said detecting head is in continuous engagement with said seal encasing said rotor during rotation thereof to maintain a predetermined distance between said toothed portion and said detecting head.

5. The wheel sensor device as recited in claim 4, wherein said wheel seal is provided with a coating of material having a low friction characteristic with which said detecting head is engageable.